United States Patent
Lee et al.

(10) Patent No.: US 8,614,558 B2
(45) Date of Patent: Dec. 24, 2013

(54) MOTOR CONTROL APPARATUS AND MOTOR CONTROL METHOD THEREOF

(75) Inventors: Ki Moon Lee, Yongin-si (KR); Yong Joon Hong, Suwon-si (KR); Chi Gun An, Suwon-si (KR); Dae Hyung Park, Koyang-Si (KR)

(73) Assignee: Samsung Electonics Co., Ltd., Suwon-Si (KR)

( * ) Notice: Subject to any disclaimer, the term of this patent is extended or adjusted under 35 U.S.C. 154(b) by 370 days.

(21) Appl. No.: 13/009,961

(22) Filed: Jan. 20, 2011

(65) Prior Publication Data

US 2011/0181223 A1  Jul. 28, 2011

(30) Foreign Application Priority Data

Jan. 25, 2010 (KR) .................. 10-2010-0006682

(51) Int. Cl.
*H02P 7/00* (2006.01)
(52) U.S. Cl.
USPC .................. 318/432; 318/568.15; 318/568.18
(58) Field of Classification Search
USPC .......... 318/432, 568.15, 568.18, 573, 568.11, 318/568.24; 901/30, 14, 9, 15; 700/246, 700/218

See application file for complete search history.

(56) References Cited

U.S. PATENT DOCUMENTS

| | | | | |
|---|---|---|---|---|
| 5,426,722 A | * | 6/1995 | Batchelder | ..... 700/245 |
| 2011/0264260 A1 | * | 10/2011 | Hong et al. | ..... 700/218 |

* cited by examiner

*Primary Examiner* — Karen Masih
(74) *Attorney, Agent, or Firm* — Staas & Halsey LLP

(57) ABSTRACT

Disclosed herein are a motor control apparatus and a motor control method thereof. The motor control method includes estimating a current torque of a motor based on dynamics of a body driven by the motor, judging whether the estimated torque is higher than a predetermined torque value, compensating for a velocity profile to drive the motor from the predetermined torque value, upon judging that the estimated torque is higher than the predetermined torque value, and driving the motor using the compensated velocity profile. Thereby, the velocity profile is compensated for in real time, and thus the velocity of the motor is raised while preventing the motor from stepping out.

20 Claims, 7 Drawing Sheets

MOTOR CONTROL APPARATUS AND MOTOR CONTROL METHOD THEREOF

CROSS-REFERENCE TO RELATED APPLICATIONS

This application claims the priority benefit of Korean Patent Application No. 10-2010-0006682, filed on Jan. 25, 2010 in the Korean Intellectual Property Office, the disclosure of which is incorporated herein by reference.

BACKGROUND

1. Field

Embodiments relate to a motor control apparatus and a motor control method thereof in which a velocity of a motor is controlled according to a velocity profile to drive the motor.

2. Description of the Related Art

In general, a robot controller to control movement of a robot performs control of a position, a velocity, and an acceleration of a motor provided on a robot joint per control cycle according to data, such as a target position, a target velocity, a target acceleration time, and a target deceleration time input by a user.

Here, the motor of the robot joint is driven according to a velocity profile.

In the velocity profile to drive the motor, a velocity zone is divided into an acceleration section, a constant velocity section, and a deceleration section. The velocity profile is defined as a polynomial expression from the position, the velocity, the acceleration time, and the deceleration time of the motor influencing the drive of the motor.

The motor is driven following the above-defined velocity profile. Further, while the motor is driven, the velocity profile is not changed.

The velocity profile is generated based on parameters, such as the position, the velocity, the acceleration time, and the deceleration time, input by the user.

In case of the velocity of the motor, an allowance torque of the motor tends to decrease as the motor reaches a high velocity region of a velocity-torque curve, generally called an NT-curve. Therefore, in order to stably use the motor in all velocity regions, a load of the motor is adjusted so as to generate only a small torque if the motor is driven within a rated RPM or at a high velocity.

However, motion-related parameters of the robot, such as velocity, acceleration, etc., need to be set such that reliability allowing the robot to stably move within all motion regions in which the robot is movable is assured and particularly, the same reliability is assured under unfavorable conditions, such as a section requiring a high torque due to uniqueness or high inertia.

Among several methods to set the parameters of the robot, the most general method is a method in which the highest velocity is set to a rated RPM of the motor, a velocity profile is generated based on the velocity, and other regions higher than the velocity are excluded.

If the motor is used under the above condition, the motor generates the maximum torque in all velocity regions, and the motor is easy to design and control. Further, since there is a margin from the rated RPM to the maximum RPM region, a region where the velocity is unexpectedly rapidly raised due to uniqueness is included, and thus considerably high reliability is assured.

However, in a normal case, a region higher than the rated RPM is not used, and thus efficiency of the velocity of the motor is considerably low.

SUMMARY

Therefore, it is an aspect to provide a motor control apparatus and a motor control method thereof in which a velocity profile is compensated for in real time using a current torque of a motor estimated from a dynamic model of a body driven by the motor so as to prevent step out of the motor and to raise a velocity of the motor.

Additional aspects will be set forth in part in the description which follows and, in part, will be obvious from the description, or may be learned by practice of the embodiments.

In accordance with one aspect, a motor control method includes estimating a current torque of a motor based on dynamics of a body driven by the motor, judging whether or not the estimated torque is higher than a predetermined torque value, compensating for a velocity profile to drive the motor from the predetermined torque value, upon judging that the estimated torque is higher than the predetermined torque value, and driving the motor using the compensated velocity profile.

In the estimation of the torque, the torque of the motor may be calculated by Expression 1 below;

$$\tau = D(q)\ddot{q} + h(q,\dot{q}) + c(q) \qquad \text{Expression 1}$$

here, $\tau$ denotes a torque of the motor, q is a position of the motor, $\dot{q}$ is a velocity of the motor, $\ddot{q}$ is an acceleration of the motor, D(q) is the sum of moment of inertia of the motor and moment of inertia of the driven body, h(q,$\dot{q}$) means the sum of coriolis force and centrifugal force, and c(q) is gravity.

In the judgment as to whether or not the estimated torque is higher than the predetermined torque value, the predetermined torque value may be a torque value corresponding to a velocity value used to estimate the torque on an NT-curve representing the relationship between the velocity and the torque of the motor.

In the compensation of the velocity profile, the velocity profile to drive the motor may be one out of the previous velocity profile used to drive the motor at the previous control cycle and a velocity profile generated from a target position, a target velocity, a target acceleration time, and a target deceleration time input by a user.

The compensation of the velocity profile may include calculating an acceleration of the motor according to the predetermined torque value, calculating a velocity of the motor according to the calculated acceleration, and compensating for the velocity profile using the calculated velocity.

The acceleration of the motor may be calculated by Expression 2 below, and the velocity of the motor may be calculated by Expression 3 below;

$$\ddot{q} = \frac{\tau_{NT\_curve} - h(q,\dot{q}) + c(q)}{D(q)} \qquad \text{Expression 2}$$

$$\dot{q} = \dot{q}_{prev} + \frac{\tau_{NT\_curve} - h(q,\dot{q}) + c(q)}{D(q)} \qquad \text{Expression 3}$$

here, $\tau_{NT\_curve}$ denotes the predetermined torque value, q means a position of the motor, $\dot{q}$ is the velocity of the motor, $\ddot{q}$ is the acceleration of the motor, D(q) is the sum of moment of inertia of the motor and moment of inertia of the driven body, c(q) is gravity, and $\dot{q}_{prev}$ is the previous velocity.

The estimation of the torque of the motor may include estimating the torque of the motor per control cycle.

In accordance with another aspect, a motor control method includes receiving a previous position, a previous velocity, and a previous acceleration of a motor provided on an driven body, estimating a current torque of the motor using dynamics of the driven body according to the input data, and driving the motor using different velocity profiles according to the estimated torque of the motor.

The drive of the motor may include comparing the estimated torque of the motor with a predetermined torque value, driving the motor using the previous velocity profile, if, as a result of the comparison, the estimated torque is not higher than the predetermined torque value, and driving the motor using a velocity profile obtained by compensating for the previous velocity profile according to the predetermined torque value, if the estimated torque is higher than the predetermined torque value.

The drive of the motor using the compensated velocity profile may include calculating an acceleration of the motor according to the predetermined torque value, calculating a velocity of the motor according to the calculated acceleration, and compensating for the previous velocity profile using the calculated velocity.

In the drive of the motor, the predetermined torque value may be a torque value corresponding to a velocity value used to estimate the torque on an NT-curve representing the relationship between the velocity and the torque of the motor.

In accordance with a further aspect, a motor control apparatus includes a torque estimation unit to estimate a current torque of a motor based on dynamics of a body driven by the motor, a velocity profile compensation unit to compensate for a velocity profile to drive the motor, a motor drive unit to drive the motor, and a motor control unit to estimate the torque of the motor through the torque estimation unit, to judge whether the estimated torque is higher than a predetermined torque value, to compensate for the velocity profile according to the predetermined torque value through the velocity profile compensation unit, upon judging that the estimated torque is higher than the predetermined torque value, and to drive the motor according to the compensated velocity profile through the motor drive unit.

The motor control unit may calculate an acceleration of the motor according to the predetermined torque value, calculate a velocity of the motor according to the calculated acceleration, and compensate for the velocity profile using the calculated velocity.

The predetermined torque value may be a torque value corresponding to a velocity value used to estimate the torque on an NT-curve representing the relationship between the velocity and the torque of the motor.

The motor control unit may estimate the torque of the motor through the torque estimation unit per control cycle.

The velocity profile to drive the motor may be one out of the previous velocity profile used to drive the motor at the previous control cycle and a velocity profile generated from a target position, a target velocity, a target acceleration time, and a target deceleration time input by a user.

BRIEF DESCRIPTION OF THE DRAWINGS

These and/or other aspects of the embodiments will become apparent and more readily appreciated from the following description of the embodiments, taken in conjunction with the accompanying drawings of which.

DETAILED DESCRIPTION

Figure 1:
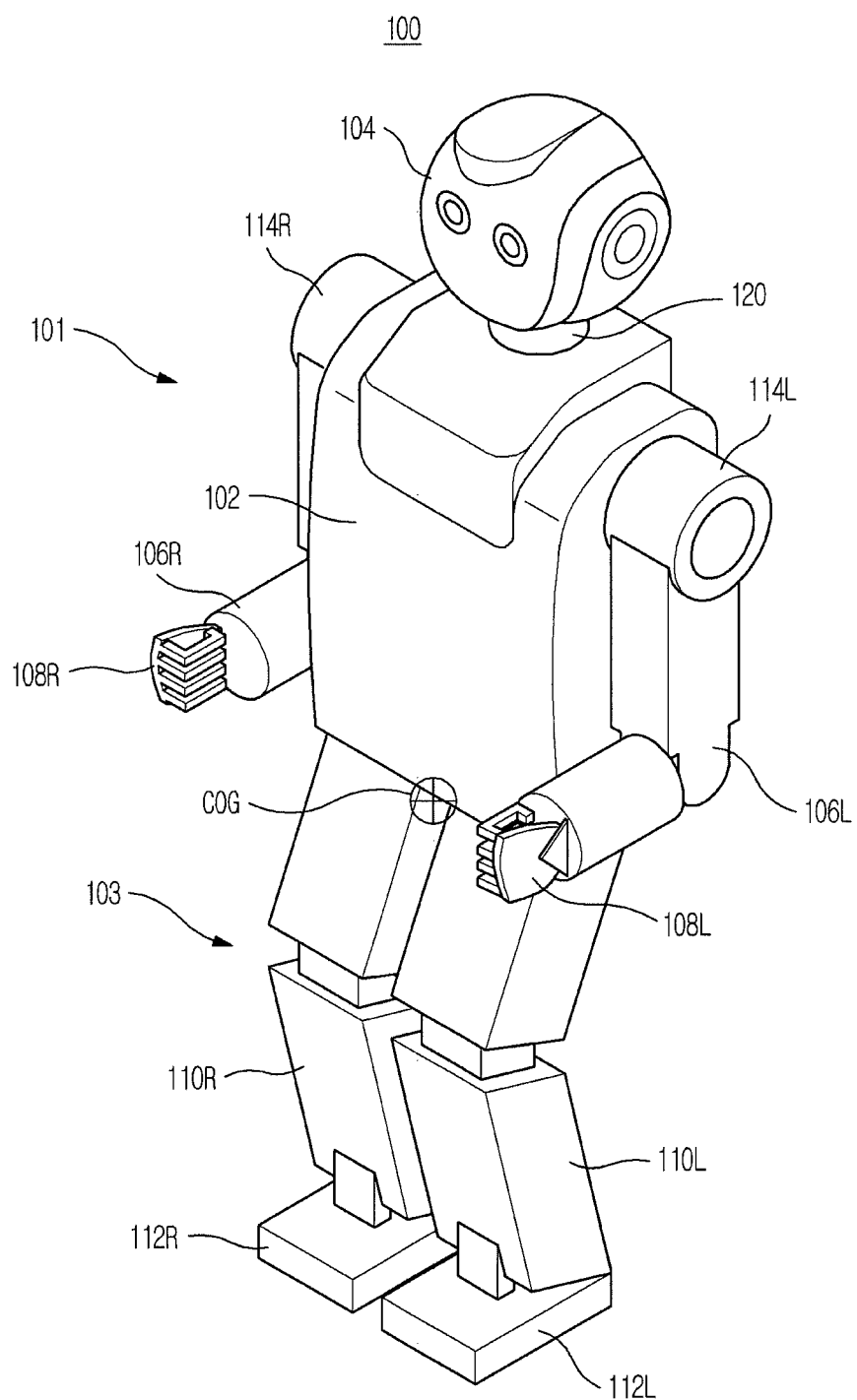
FIG. 1 is a perspective view illustrating an external appearance of a robot to which a motor control apparatus in accordance with one embodiment is applied.

Reference will now be made in detail to the embodiments, examples of which are illustrated in the accompanying drawings, wherein like reference numerals refer to like elements throughout.

Hereinafter, for convenience of description, a humanoid robot having robot joints driven by motors will be described as a driven body to which a motor control apparatus in accordance with one embodiment is applied. However, the driven body may be an industrial robot instead of the humanoid robot, or may be other bodies driven by motors.

FIG. 1 is a perspective view illustrating an external appearance of a robot to which the motor control apparatus in accordance with the embodiment is applied.

As shown in FIG. 1, a robot 100 in accordance with this embodiment is a bipedal robot which walks erect using two legs 110L and 110R in the same manner as a human, and includes an upper body 101 including a torso 102, a head 104, and two arms 106L and 106R, and a lower body 103 including the two legs 110L and 110R.

The upper body 101 of the robot 100 includes the torso 102, the head 104 connected to the upper portion of the torso 102 through a neck 120, the two arms 106L and 106R connected to both sides of the upper portion of the torso 102 through shoulders 114L and 114R, and hands 108L and 108R connected to the tips of the two arms 106L and 106R.

The lower body 103 of the robot 100 includes the two legs 110L and 110R connected to both sides of the lower portion of the torso 102 of the upper body 101, and feet 112L and 112R connected to the tips of the two legs 110L and 110R.

Here, "R" and "L" respectively represent the right side and the left side of the robot 100, and "COG" represents the center of gravity of the robot 100.

Figure 2:
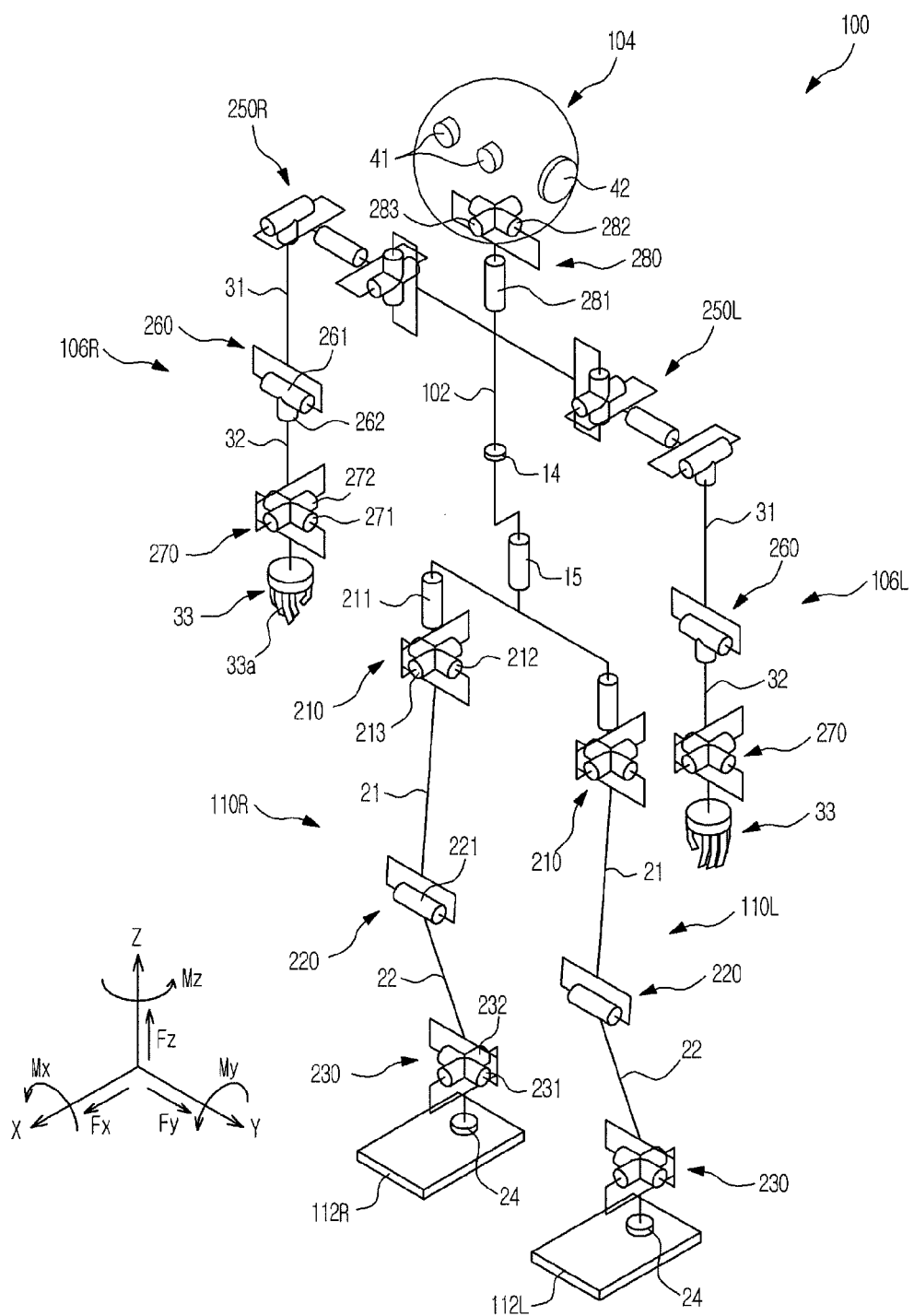
FIG. 2 is a view illustrating structures of main joints of the robot of FIG. 1.

FIG. 2 is a view illustrating structures of main joints of the robot of FIG. 1.

As shown in FIG. 2, a pose sensor 14 is installed on the torso 102 of the robot 100. The pose sensor 14 detects a tilt angle, i.e., a gradient of the upper body 101 relative to a vertical axis, and an angular velocity thereof, and generates pose data based on the detected tilt angle and angular velocity.

A waist joint unit 15 having 1 degree of freedom (DOF) in the yaw direction to rotate the upper body 101 is installed on the torso 101.

Further, cameras 41 to capture a surrounding image and microphones 42 for user voice input are installed on the head 104 of the robot 100.

The head 104 is connected to the torso 102 of the upper body 101 through a neck joint unit 280. The neck joint unit 280 includes a rotary joint 281 rotated in the yaw direction (in the direction of the Z-axis), a rotary joint 282 rotated in the pitch direction (in the direction of the Y-axis), and a rotary joint 283 rotated in the roll direction (in the direction of the X-axis), and thus has 3 DOFs.

Motors to rotate the head 104 are respectively connected to the rotary joints 281, 282, and 283 of the neck joint unit 280.

Each of the two arms 106L and 106R of the robot 100 includes an upper arm link 31, a lower arm link 32, and a hand 33.

The upper arm links 31 are connected to the upper body 101 through shoulder joint units 250L and 250R, the upper arm links 31 and the lower arm links 32 are connected to each other through elbow joint units 260, and the lower arm links 32 and the hands 33 are connected to each other through wrist joint units 270.

The shoulder joint units 250L and 250R are installed at both sides of the torso 102 of the upper body 101, and connect the two arms 106L and 106R to the torso 102 of the upper body 101.

Each of the elbow joint units 260 includes a rotary joint 261 rotated in the pitch direction and a rotary joint 262 rotated in the yaw direction, and thus has 2 DOFs.

Each of the wrist joint units 270 includes a rotary joint 271 rotated in the pitch direction and a rotary joint 272 rotated in the roll direction, and thus has 2 DOFs.

Five fingers 33a are installed on each of the hands 33. A plurality of joints (not shown) driven by motors may be installed on each of the fingers 33a. The fingers 33a perform various motions, such as gripping of a body or pointing in a specific direction, in connection with movements of the arms 106.

Further, each of the two legs 110L and 110R of the robot 100 includes a thigh link 21, a calf link 22, and a foot 112L or 112R.

The thigh links 21 are connected to the torso 102 of the upper body 101 through hip joint units 210, the thigh links 21 and the calf links 22 are connected to each other through knee joint units 220, and the calf links 22 and the feet 112L and 112R are connected to each other through ankle joint units 230.

Each of the hip joint units 210 includes a rotary joint 211 rotated in the yaw direction (in the direction of the Z-axis), a rotary joint 212 rotated in the pitch direction (in the direction of the Y-axis), and a rotary joint 213 rotated in the roll direction (in the direction of the X-axis), and thus has 3 DOFs.

Each of the knee joint units 220 includes a rotary joint 221 rotated in the pitch direction, and thus has 1 DOF.

Each of the ankle joint units 230 includes a rotary joint (ankle pitch joint) 231 rotated in the pitch direction and a rotary joint 232 (ankle roll joint) rotated in the roll direction, and thus has 2 DOFs.

Since 6 rotary joints of the hip joint units 210, the knee joint units 220, and the ankle joint units 230 are provided on each of the two legs 110L and 110R, total 12 rotary joints are provided on the two legs 110L and 110R.

A multi-axis force and torque (F/T) sensor 24 is installed between the foot 112L or 112R and the ankle joint unit 230 of each of the two legs 110L and 110R. The F/T sensor 24 measures three-directional components Mx, My, and Mz of moment and three-directional components Fx, Fy, and Fz of force transmitted from each of the feet 112L and 112R, thus detecting whether or not each of the feet 112L and 112R contacts the ground and load applied to the feet 112L and 112R.

Although not shown in the drawings, motors to respectively drive the rotary joints are installed on the robot 100. The motor control apparatus in accordance with the embodiment properly controls such a motor to allow robot 100 to achieve various motions.

Figure 3:
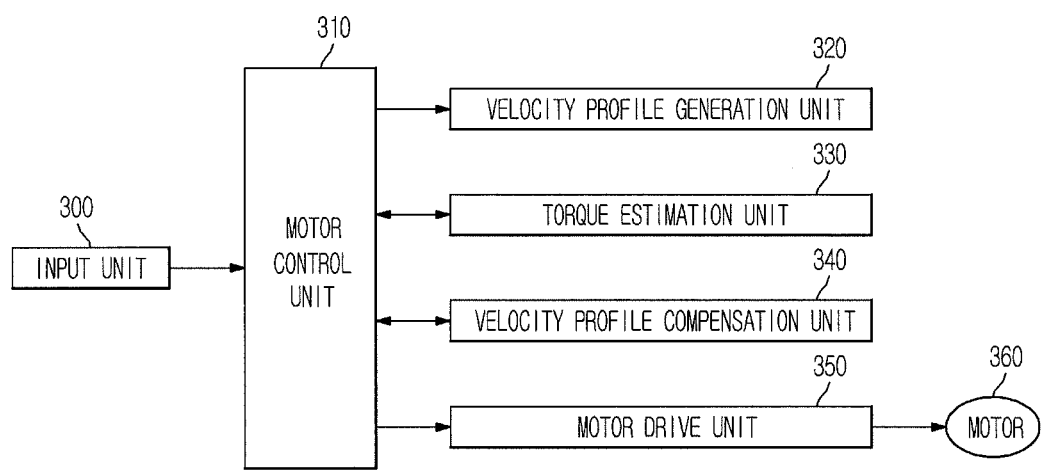
FIG. 3 is a control block diagram of the motor control apparatus in accordance with the embodiment.

FIG. 3 is a control block diagram of the motor control apparatus in accordance with the embodiment.

As shown in FIG. 3, the motor control apparatus in accordance with the embodiment includes an input unit 300, a motor control unit 310, a velocity profile generation unit 320, a torque estimation unit 330, a velocity profile compensation unit 340, and a motor drive unit 350.

The input unit 300 is electrically connected to the motor control unit 310, which performs general control of a motor 360. However, it is understood that the input unit 300 may be optically connected to the motor control unit 310. The input unit 300 receives velocity profile generation data to generate a velocity profile, input by a user.

The velocity profile generation data may include a position, a velocity, an acceleration time, and a deceleration time of the motor 360. The velocity profile generation data may further include an acceleration and a deceleration instead of the acceleration time and the deceleration time.

The velocity profile expresses a movement amount of a motor to be moved per control cycle to drive the motor. The motor receives a moving position thereof per control cycle by integrating such a value, thus being driven. That is, the velocity profile expresses a series of velocity values of the motor, to move the robot joint from a start position to a target position, at respective times.

Further, the velocity profile generation unit 320, the torque estimation unit 330, the velocity profile compensation unit 340, and the motor drive unit 350 are electrically connected to the motor control unit 310.

The velocity profile generation unit 320 may generate a velocity profile from the position, the velocity, the acceleration time, and the deceleration time of the motor 360 input through the input unit 300 according to a control signal of the motor control unit 310.

The torque estimation unit 330 estimates a current torque of the motor 360 using a dynamic model of a robot which is driven by the motor 360 according to the control signal of the motor control unit 310.

The current torque τ of the motor 360 using the dynamic model of the robot is defined by Expression 1 below.

$$\tau = D(q)\ddot{q} + h(q,\dot{q}) + c(q) \qquad \text{Expression 1}$$

Here, τ is a torque of the motor, q is a position of the motor, $\dot{q}$ is a velocity of the motor, $\ddot{q}$ is an acceleration of the motor, D(q) is the sum of moment of inertia of the motor and moment of inertia of the robot joint, h(q,q) is the sum of coriolis force and centrifugal force, and c(q) is gravity.

Respective terms represent amounts of torque according to acceleration, velocity, and position, and any additional term, such as frictional force, may be considered.

The velocity profile compensation unit 340 calculates an acceleration according to a torque $\tau_{NT\_curve}$ on an NT-curve when the current torque τ of the motor 360 estimated using the dynamic model of the robot according to the control signal of the motor control unit 310, calculates a velocity from the calculated acceleration, and compensates for the previous velocity profile using the velocity.

Here, the acceleration $\ddot{q}$ according to the torque $\tau_{NT\_curve}$ on the NT-curve is an acceleration at which the motor 360 may move per control cycle, and is calculated by Expression 2 below.

$$\ddot{q} = \frac{\tau_{NT\_curve} - h(q, \dot{q}) + c(q)}{D(q)} \qquad \text{Expression 2}$$

The velocity q̇ of the motor 360 calculated from the acceleration q̈ of the motor 360 calculated through Expression 2 is the maximum velocity at which the motor 360 may move, and is calculated by Expression 3 below.

$$\dot{q} = \dot{q}_{prev} + \frac{\tau_{NT\_curve} - h(q, \dot{q}) + c(q)}{D(q)} \qquad \text{Expression 3}$$

Here, $\dot{q}_{prev}$ is the previous velocity.

Consequently, the velocity profile compensation unit 340 compensates for the previous velocity profile using the velocity of the motor 360 calculated through Expression 3.

That is, the velocity profile compensation unit 340 compensates for the previous velocity profile to have the velocity value calculated through Expression 3 instead of the velocity value of the previous velocity profile at the current control cycle. Here, the compensated velocity profile is a velocity profile in which velocity values at respective times are compensated for to have the same target position and target velocity as those of the previous velocity profile.

The motor drive unit 350 drives the motor 360 using the previous velocity profile or the compensated velocity profile according to the control signal of the motor control unit 310. Thereby, the motor 360 is driven following the previous velocity profile or the compensated velocity profile during one control cycle. That is, the motor 360 is driven so that the velocity of the motor 360 reaches the velocity value of the previous velocity profile corresponding to the current control cycle or the velocity value of the compensated velocity profile.

The motor control unit 310 provides the position, the velocity, the acceleration time, and the deceleration time, input through the input unit 300, to the velocity profile generation unit 320, and generates the velocity profile through the velocity profile generation unit 320.

As described above, such a velocity profile represents velocity values at respective times satisfying the target position, the target velocity, the target acceleration time, and the target deceleration time, input through the input unit 300.

Further, the motor control unit 310 estimates the current torque of the motor 360 per control cycle using the dynamic model of the robot driven by the motor 360 through the torque estimation unit 330.

Further, the motor control unit 310 compares the torque estimated through the torque estimation unit 330 with a predetermined torque value, and compensates for the velocity profile based on the predetermined torque through the velocity profile compensation unit 340, if the estimated torque is greater than the predetermined torque.

Here, the predetermined torque value is a torque value on the NT-curve at the current control cycle. That is, the predetermined torque value is a torque value corresponding to a velocity used to estimate the torque on the NT-curve representing the relationship between the velocity N and the torque T of the motor 360. The NT-curve is predetermined.

That is, the motor control unit 310 compares the current torque of the motor 360 estimated using the dynamic model of the robot with the torque value on the NT-curve corresponding to the current torque, and compensates for the velocity profile based on the torque value on the NT-curve such that the torque is limited if the estimated torque is greater than the torque value on the NT-curve.

Further, the motor control unit 310 controls the motor drive unit 350 such that the motor 360 is driven according to the compensated velocity profile. That is, the motor control unit 310 drives the motor 360 such that the velocity of the motor 360 reaches a velocity value on the compensated velocity profile corresponding to the current control cycle.

Figure 4:
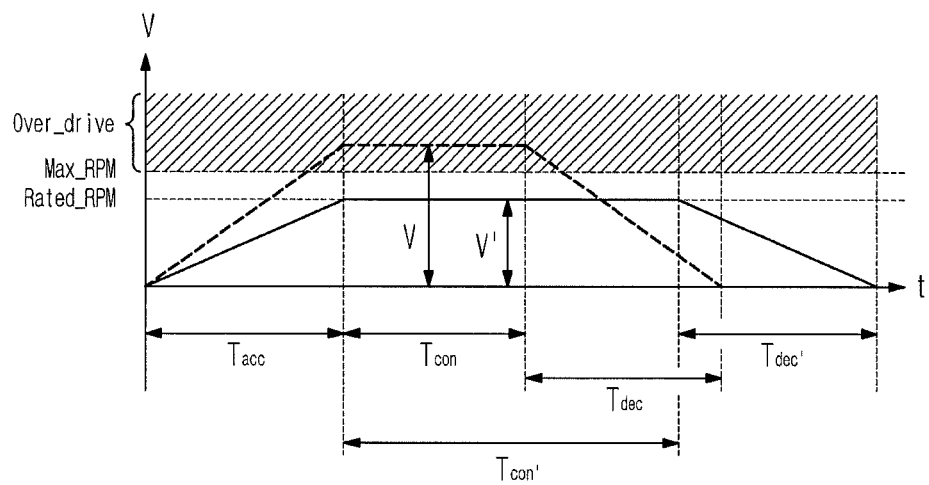
FIG. 4 is a graph illustrating a velocity profile generated according to data input by a user in the motor control apparatus in accordance with the embodiment.
Figure 5:
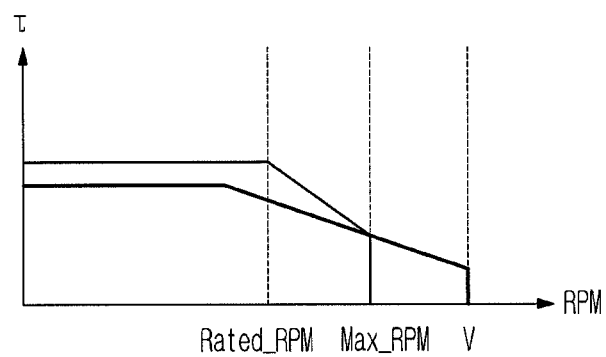
FIG. 5 is a graph illustrating velocity-torque curves before and after extension in the motor control apparatus in accordance with the embodiment.

FIG. 4 illustrates a velocity profile generated according to data input by a user in the motor control apparatus in accordance with the embodiment. FIG. 5 illustrates velocity-torque curves before and after expansion in the motor control apparatus in accordance with the embodiment.

As shown in FIG. 4, a trapezoidal velocity profile requires constant current during acceleration and deceleration and has a short time to reach a target position, and thus is mainly used.

The velocity profile of the motor 360 is formed in a trapezoidal shape including an acceleration section $T_{acc}$, a constant velocity section $T_{con}$, and a deceleration section $T_{dec}$ according to the position, the velocity, the acceleration time, and the deceleration time of the motor 360.

Set-up of the acceleration section $T_{acc}$ and the deceleration section $T_{dec}$ serves to prevent step out of the motor due to rotation according to the value of the highest velocity, and set values thereof are important. When the acceleration time is excessively long, a constant velocity operation time becomes short, and at this time, the velocity of the motor becomes slow. The position of the motor is expressed by dimensions, and the acceleration time and the deceleration time thereof are generally set to the same value.

The most important factor in the operation of the motor is to prevent of the motor from stepping out during operation. Therefore, the highest velocity of the motor is generally set to a value not exceeding a rated RPM.

A solid line represents a conventional velocity profile generated by setting the highest velocity V' to the rated RPM.

On the other hand, a dotted line represents a velocity profile generated by raising the highest velocity V to a velocity within an over-drive region, which is a velocity region higher than the maximum RPM. That is, the velocity profile represented by the dotted line is obtained by adjusting only the velocity to be higher than that of the velocity profile represented by the solid line. The reason why the step out of the motor is prevented even though the motor is driven using the velocity profile represented by the dotted line is that, in the embodiment of the present invention, the current torque of the motor is estimated using a dynamic equation of the robot per control cycle, and the previous velocity profile is compensated for in real time, if the estimated torque exceeds the predetermined torque value.

In FIG. 4, movement amounts of the motor, i.e., respective dimensions of trapezoidal shapes, in the velocity profile represented by the dotted line and the velocity profile represented by the solid line are the same.

In the embodiment, the motor 360 is driven at an initial state using the velocity profile represented by the dotted line, judgment as to whether or not the current torque of the motor 360, estimated using the dynamic equation of the robot, is excessive by comparing the current torque with the predetermined torque value is carried out whenever the control cycle is changed, the velocity profile represented by the dotted line is compensated for to limit the torque value, if it is judged that the estimated torque is excessive, and then the motor 360 is driven using the compensated velocity profile.

As shown in FIG. 5, as the velocity increases, the torque generated from the motor 360 is reduced, and thus the motor 360 is overloaded and step out of the motor 360 may be generated.

In FIG. 5, a thin solid line represents a standard NT-curve in which the highest velocity is limited to a rated RPM. Since, in the standard NT-curve, the highest velocity is limited to the rated RPM, even though the velocity of the motor 360 is unexpectedly raised to be higher than the rated RPM, step out of the motor 360 is not generated up to a fixed level.

However, since a region higher than the rated RPM is not generally used, the motor 360 is driven in a relatively low velocity region.

On the other hand, a thick solid line represents an NT-curve extended from the standard NT-curve. Since, in the extended NT-curve, torque is lowered in a velocity region prior to the maximum RPM but the highest velocity is extended to a velocity region higher than the maximum RPM, the motor 360 may be driven in a relatively high velocity region.

In the embodiment, if the torque of the motor 360 estimated using the dynamic equation exceeds the predetermined torque value, the velocity profile is compensated for in real time and the motor 360 is driven according to the compensated velocity profile, and thus step out of the motor 360 is not generated.

That is, in the embodiment, the torque of the motor 360 is estimated using the dynamic equation of the robot per control cycle, the estimated torque is compared with the torque value on the extended NT-curve of FIG. 5, the velocity profile is compensated for according to the torque value on the extended NT-curve to limit the torque, if the current torque of the motor 360 exceeds the torque value on the extended NT-curve, and the motor 360 is driven according to the compensated velocity profile, thereby preventing from the motor 360 stepping out.

Figure 6:
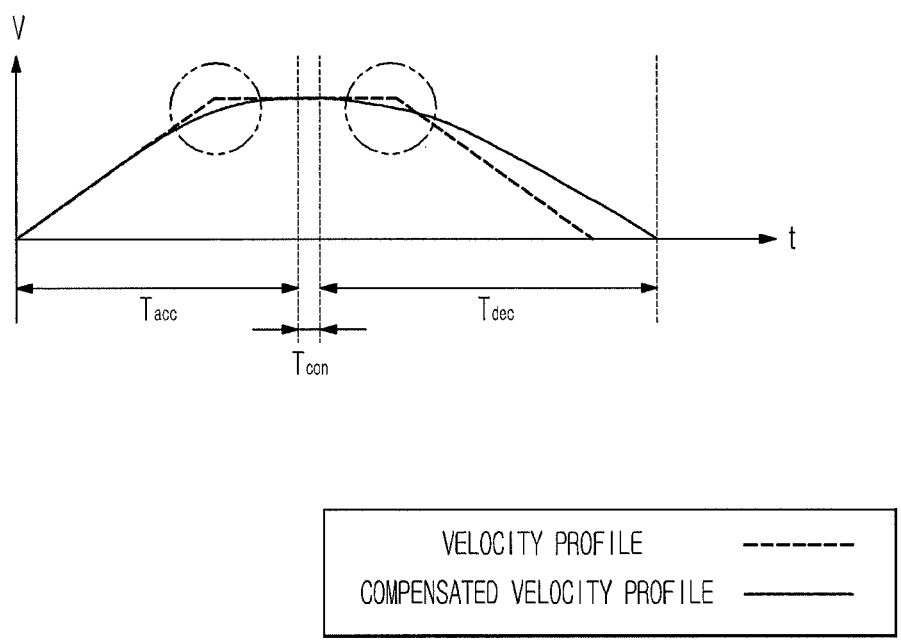
FIG. 6 is a graph illustrating a compensated velocity profile in the motor control apparatus in accordance with the embodiment.

FIG. 6 illustrates a compensated velocity profile in the motor control apparatus in accordance with the embodiment.

As shown in FIG. 6, a dotted line represents a velocity profile prior to compensation, and a solid line represents a compensated velocity profile.

It is noted that in the compensated velocity profile represented by the solid line, high velocity regions, expressed by circles shown in a chain double-dashed line, are mainly compensated for, compared with the velocity profile prior to compensation represented by the dotted line. This is caused by decrease of the torque as the velocity is closer to the high velocity region, as shown in FIG. 5.

That is, when the velocity is changed from the acceleration section to the constant velocity section and when the velocity is changed from the constant velocity section to the deceleration section, as expressed by the circles shown in the chain double-dashed line, compensation for the velocity profile is mainly achieved. Here, it is noted that the velocity of the compensated velocity profile is lower than the velocity of the velocity profile prior to compensation for the restricted times corresponding to the circles shown in the chain double-dashed line.

More specifically with reference to FIG. 6, before the motor 360 reaches the region shown in the chain double-dashed line in which the velocity is changed from the acceleration section to the constant velocity section, the motor 360 is driven following the velocity profile prior to compensation represented by the dotted line.

This means that the torque of the motor 360 estimated based on the dynamic equation of the robot does not exceed the torque value on the NT-curve of FIG. 5 having the velocity corresponding thereto before the motor 360 reaches the region in which the velocity is changed from the acceleration section to the constant velocity section.

Then, when the motor 360 reaches the region in which the velocity is changed from the acceleration section to the constant velocity section, the motor 360 is driven using the compensated velocity profile instead of the velocity profile prior to compensation represented by the dotted line.

This means that the torque of the motor 360 estimated based on the dynamic equation of the robot exceeds the torque value on the NT-curve of FIG. 5 having the velocity corresponding thereto in the region in which the velocity is changed from the acceleration section to the constant velocity section.

Further, the compensated velocity profile is made by reflecting the velocity value calculated from the torque value on the NT-curve on the velocity profile prior to compensation represented by the dotted line (with reference to the velocity profile represented by the solid line). Here, the compensated velocity profile may compensate for the velocity profile prior to compensation represented by the dotted line for all time sections, or may compensate for the velocity profile prior to compensation represented by the dotted line only for time sections which will progress thereafter, except for the time sections which progressed already.

Figure 7:
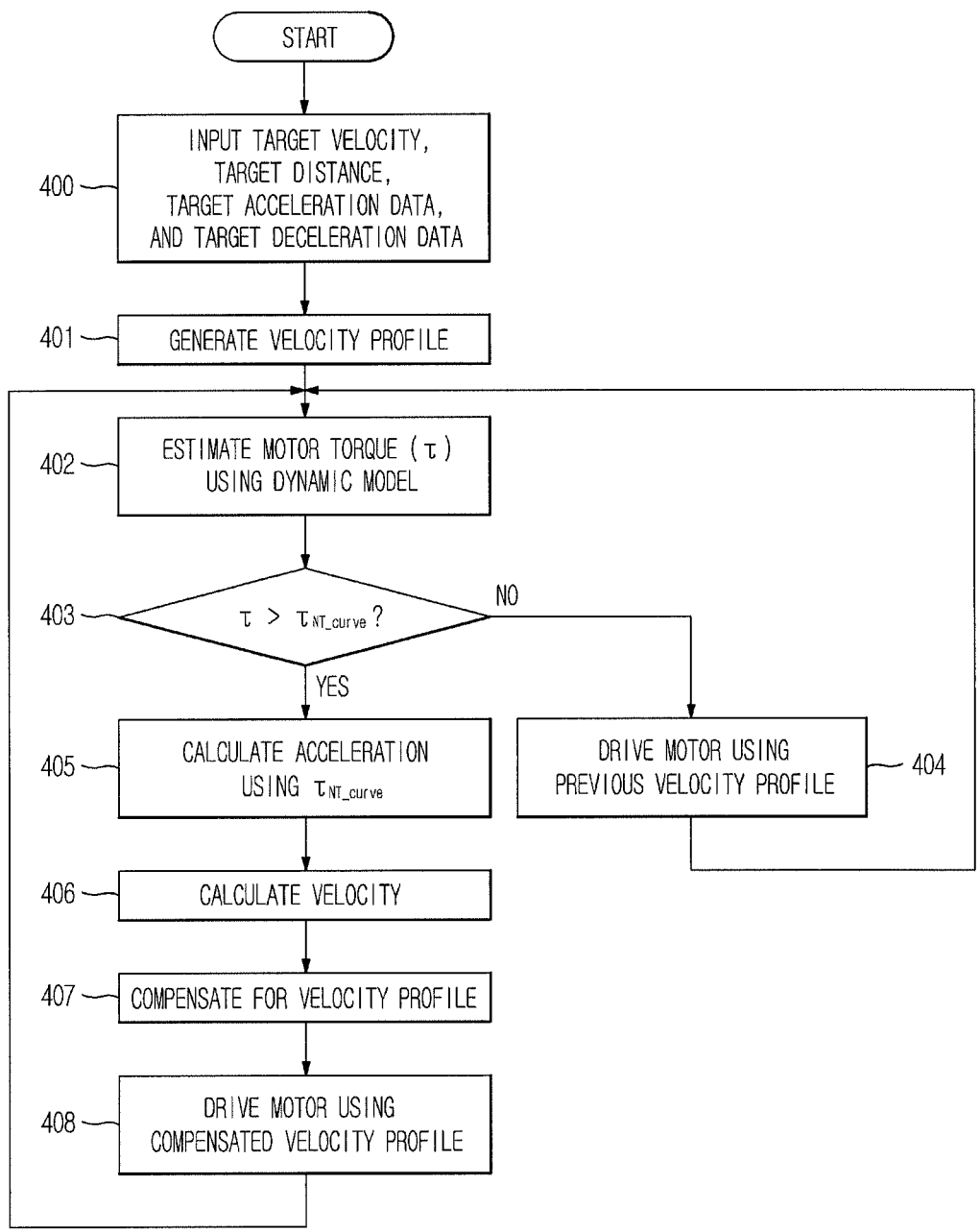
FIG. 7 is a flow chart illustrating a motor control method in accordance with one embodiment.

FIG. 7 is a flow chart illustrating a motor control method in accordance with one embodiment.

With reference to FIG. 7, the motor control unit 310 receives velocity profile generation data, such as a position, a velocity, an acceleration time, and a deceleration time of the motor 360, input by a user through the input unit 300 (operation 400).

When the motor control unit 310 receives the position, the velocity, the acceleration time, and the deceleration time of the motor 360, input by the user, the motor control unit 310 controls the velocity profile generation unit 320 to generate a velocity profile from the position, the velocity, the acceleration time, and the deceleration time of the motor 360 (operation 401).

After the velocity profile is generated, the motor control unit 310 estimates a torque $\tau$ of the motor 360 using a dynamic model of a robot through the torque estimation unit 330 (operation 402). Here, the torque $\tau$ of the motor 360 is calculated by Expression 1 below.

$$\tau = D(q)\ddot{q} + h(q,\dot{q}) + c(q) \qquad \text{Expression 1}$$

Here, $\tau$ is a torque of the motor, q is a position of the motor, $\dot{q}$ is a velocity of the motor, $\ddot{q}$ is an acceleration of the motor, D(q) is the sum of moment of inertia of the motor and moment of inertia of the robot joint, h(q,q) is the sum of coriolis force and centrifugal force, and c(q) is gravity.

After the torque $\tau$ of the motor 360 is estimated, the motor control unit 310 compares the estimated torque $\tau$ with a predetermined torque, i.e., a torque $\tau_{NT\_curve}$ on the NT-curve, and judges whether the estimated torque $\tau$ exceeds the torque $\tau_{NT\_curve}$ on the NT-curve (operation 403).

As a result of operation 403, if it is judged that the estimated torque $\tau$ is less than the torque $\tau_{NT\_curve}$ on the NT-curve, the motor 360 is driven according to the previous velocity profile (operation 404). Here, the previous velocity profile is the velocity profile generated during operation 401 at an initial stage, and is the velocity profile used at the previous control cycle if there is a compensated velocity profile. Thereafter, the method is fed back to operation 402, and then the following operations are performed.

On the other hand, as the result of operation 403, if it is judged that the estimated torque $\tau$ exceeds the torque $\tau_{NT\_curve}$ on the NT-curve, an acceleration of the motor 360 is calculated using the torque $\tau_{NT\_curve}$ on the NT-curve to limit the torque of the motor 360 to the torque $\tau_{NT\_curve}$ on the NT-curve (operation 405), and a velocity of the motor 360 is calculated using the calculated acceleration (operation 406).

The acceleration $\ddot{q}$ of the motor 360 calculated from the torque $\tau_{NT\_curve}$ on an NT-curve is the maximum acceleration at which the motor 360 may move per control cycle, and is calculated by Expression 2 below.

$$\ddot{q} = \frac{\tau_{NT\_curve} - h(q, \dot{q}) + c(q)}{D(q)} \qquad \text{Expression 2}$$

Further, the velocity $\dot{q}$ of the motor 360 calculated from the calculated acceleration $\ddot{q}$ of the motor 360 is the maximum velocity which the motor 360 may generate, and is calculated by Expression 3 below.

$$\dot{q} = \dot{q}_{prev} + \frac{\tau_{NT\_curve} - h(q, \dot{q}) + c(q)}{D(q)} \qquad \text{Expression 3}$$

Here, $\dot{q}_{prev}$ is the previous velocity.

Consequently, the velocity profile generated during operation 401 using Expression 3 is compensated for in real time, thereby being capable of driving the robot with the desired maximum efficiency.

After the velocity of the motor 360 according to the torque $\tau_{NT\_curve}$ on an NT-curve is calculated, the motor control unit 310 controls the velocity profile compensation unit 340 to compensate for the velocity profile generated during operation 401 using the calculated velocity (operation 407).

Thereafter, the motor control unit 310 controls the motor drive unit 350 to drive the motor 360 using the compensated velocity profile (operation 408). Thereafter, the method is fed back to operation 402, and the following operations are performed.

As is apparent from the above description, in a motor control apparatus and a motor control method thereof in accordance with one embodiment, a velocity profile to drive a motor is compensated for in real time using a current torque of the motor estimated from a dynamic model of a body driven by the motor, thereby being capable of driving the motor at the maximum velocity while preventing step out of the motor and thus raising the velocity of the motor.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A motor control method, comprising:
 estimating a current torque of a motor based on dynamics of a body driven by the motor;
 judging whether the estimated torque is higher than a predetermined torque value;
 compensating for a velocity profile to drive the motor from the predetermined torque value, upon judging that the estimated torque is higher than the predetermined torque value; and
 driving the motor using the compensated velocity profile.

2. The motor control method according to claim 1, wherein, in the estimating of the current torque, the torque of the motor is calculated by Expression 1 below;

$$\tau = D(q)\ddot{q} + h(q,\dot{q}) + c(q) \qquad \text{Expression 1}$$

here, $\tau$ is a torque of the motor, q is a position of the motor, $\dot{q}$ is a velocity of the motor, $\ddot{q}$ is an acceleration of the motor, D(q) is a sum of moment of inertia of the motor and moment of inertia of the driven body, h(q,q) is a sum of coriolis force and centrifugal force, and c(q) is gravity.

3. The motor control method according to claim 2, wherein, in the judging as to whether the estimated torque is higher than the predetermined torque value, the predetermined torque value is a torque value corresponding to a velocity value used to estimate the torque on a velocity-torque-curve representing the relationship between the velocity and the torque of the motor.

4. The motor control method according to claim 1, wherein, in the compensating of the velocity profile, the velocity profile to drive the motor is one out of the previous velocity profile used to drive the motor at the previous control cycle and a velocity profile generated from a target position, a target velocity, a target acceleration time, and a target deceleration time input by a user.

5. The motor control method according to claim 4, wherein the compensating of the velocity profile includes calculating an acceleration of the motor according to the predetermined torque value, calculating a velocity of the motor according to the calculated acceleration, and compensating for the velocity profile using the calculated velocity.

6. The motor control method according to claim 5, wherein the acceleration of the motor is calculated by Expression 2 below, and the velocity of the motor is calculated by Expression 3 below;

$$\ddot{q} = \frac{\tau_{NT\_curve} - h(q, \dot{q}) + c(q)}{D(q)} \qquad \text{Expression 2}$$

$$\dot{q} = \dot{q}_{prev} + \frac{\tau_{NT\_curve} - h(q, \dot{q}) + c(q)}{D(q)} \qquad \text{Expression 3}$$

here, $\tau_{NT\_curve}$ is the predetermined torque value, q is a position of the motor, $\dot{q}$ is the velocity of the motor, $\ddot{q}$ is the acceleration of the motor, D(q) is the sum of moment of inertia of the motor and moment of inertia of the driven body, c(q) is gravity, and $\dot{q}_{prev}$ is the previous velocity.

7. The motor control method according to claim 1, wherein the estimating of the torque of the motor includes estimating the torque of the motor per control cycle.

8. A motor control method, comprising:
 receiving a previous position, a previous velocity, and a previous acceleration of a motor provided on an driven body;
 estimating a current torque of the motor using dynamics of the driven body according to the input data; and
 driving the motor using different velocity profiles according to the estimated torque of the motor.

9. The motor control method according to claim 8, wherein the driving of the motor includes:
 comparing the estimated torque of the motor with a predetermined torque value;
 driving the motor using the previous velocity profile, if, as a result of the comparison, the estimated torque is not higher than the predetermined torque value; and
 driving the motor using a velocity profile obtained by compensating for the previous velocity profile according to the predetermined torque value, if the estimated torque is higher than the predetermined torque value.

10. The motor control method according to claim 9, wherein the driving of the motor using the compensated velocity profile includes calculating an acceleration of the motor according to the predetermined torque value, calculating a velocity of the motor according to the calculated acceleration, and compensating for the previous velocity profile using the calculated velocity.

11. The motor control method according to claim 10, wherein the acceleration of the motor is calculated by Expression 2 below, and the velocity of the motor is calculated by Expression 3 below;

$$\ddot{q} = \frac{\tau_{NT\_curve} - h(q, \dot{q}) + c(q)}{D(q)} \quad \text{Expression 2}$$

$$\dot{q} = \dot{q}_{prev} + \frac{\tau_{NT\_curve} - h(q, \dot{q}) + c(q)}{D(q)} \quad \text{Expression 3}$$

here, $\tau_{NT\_curve}$ is the predetermined torque value, q is a position of the motor, $\dot{q}$ is the velocity of the motor, $\ddot{q}$ is the acceleration of the motor, D(q) is the sum of moment of inertia of the motor and moment of inertia of the driven body, c(q) is gravity, and $\dot{q}_{prev}$ is the previous velocity.

12. The motor control method according to claim 9, wherein, in the drive of the motor, the predetermined torque value is a torque value corresponding to a velocity value used to estimate the torque on a velocity-torque-curve representing the relationship between the velocity and the torque of the motor.

13. A motor control apparatus, comprising:
a torque estimation unit to estimate a current torque of a motor based on dynamics of a body driven by the motor;
a velocity profile compensation unit to compensate for a velocity profile to drive the motor;
a motor drive unit to drive the motor; and
a motor control unit to estimate the torque of the motor through the torque estimation unit, to judge whether the estimated torque is higher than a predetermined torque value, to compensate for the velocity profile according to the predetermined torque value through the velocity profile compensation unit, upon judging that the estimated torque is higher than the predetermined torque value, and to drive the motor according to the compensated velocity profile through the motor drive unit.

14. The motor control apparatus according to claim 13, wherein the motor control unit calculates an acceleration of the motor according to the predetermined torque value, calculates a velocity of the motor according to the calculated acceleration, and compensates for the velocity profile using the calculated velocity.

15. The motor control apparatus according to claim 14, wherein the predetermined torque value is a torque value corresponding to a velocity value used to estimate the torque on an NT-curve representing the relationship between the velocity and the torque of the motor.

16. The motor control apparatus according to claim 13, wherein the motor control unit estimates the torque of the motor through the torque estimation unit per control cycle.

17. The motor control apparatus according to claim 13, wherein the velocity profile to drive the motor is one out of the previous velocity profile used to drive the motor at the previous control cycle and a velocity profile generated from a target position, a target velocity, a target acceleration time, and a target deceleration time input by a user.

18. The method of controlling a robot having the motor control method of claim 1.

19. A robot having the motor control apparatus of claim 13.

20. The motor control apparatus according to claim 13, wherein the body is a robot.

* * * * *